US012650375B2

(12) United States Patent
Zawaideh et al.

(10) Patent No.: US 12,650,375 B2
(45) Date of Patent: *Jun. 9, 2026

(54) SPECTROSCOPIC ELLIPSOMETRY SYSTEM FOR THIN FILM IMAGING

(71) Applicant: Bruker Nano, Inc., Santa Barbara, CA (US)

(72) Inventors: Emad Zawaideh, Carlsbad, CA (US); Chris Claypool, Carlsbad, CA (US)

(73) Assignee: Bruker Nano, Inc., Santa Barbara, CA (US)

( * ) Notice: Subject to any disclaimer, the term of this patent is extended or adjusted under 35 U.S.C. 154(b) by 344 days.

This patent is subject to a terminal disclaimer.

(21) Appl. No.: 18/201,248

(22) Filed: May 24, 2023

(65) Prior Publication Data

US 2023/0324283 A1 Oct. 12, 2023

Related U.S. Application Data

(63) Continuation-in-part of application No. 15/732,179, filed on Sep. 27, 2017, now Pat. No. 11,668,645.

(51) Int. Cl.
G01N 21/21 (2006.01)

(52) U.S. Cl.
CPC ..... G01N 21/211 (2013.01); G01N 2021/213 (2013.01)

(58) Field of Classification Search
CPC ........... G01N 21/211; G01N 2021/213; G01N 21/8422; G01N 21/9501; G01J 3/447
See application file for complete search history.

(56) References Cited

U.S. PATENT DOCUMENTS

| | | | |
|---|---|---|---|
| 5,889,592 A | 3/1999 | Zawaideh | |
| 5,999,267 A | 12/1999 | Zawaideh | |
| 6,384,916 B1 * | 5/2002 | Furtak | G01J 3/447 |
| | | | 356/369 |
| 6,650,415 B2 | 11/2003 | Aspnes et al. | |
| 7,492,455 B1 | 2/2009 | Johs et al. | |
| 7,505,133 B1 | 3/2009 | Zawaideh et al. | |
| 8,319,966 B2 | 11/2012 | Zawaideh et al. | |
| 2010/0245819 A1 | 9/2010 | Li | |
| 2014/0375981 A1 * | 12/2014 | Wang | G01N 21/956 |
| | | | 356/51 |
| 2016/0076942 A1 * | 3/2016 | Zawaideh | G01J 4/04 |
| | | | 356/364 |

FOREIGN PATENT DOCUMENTS

WO 2016127163 A1 8/2016

* cited by examiner

*Primary Examiner* — Kara E. Geisel
*Assistant Examiner* — Maya Hendija
(74) *Attorney, Agent, or Firm* — Quarles & Brady LLP; Yakov S. Sidorin

(57) ABSTRACT

An imaging spectroscopic ellipsometry apparatus and method configured to measure thin films with high spatial resolution. The apparatus includes a rotating compensator that enables to simultaneously collect both spectrometric ellipsometric data and ellipsometric imaging with the use of the same measurement beam of light. Collecting both data sets simultaneously increases the information content for analysis and affords a substantial increase in measurement performance.

20 Claims, 15 Drawing Sheets

Prior Art

Commercial Spectroscopic Reflectometry System

Top Region

Spectroscopic Ellipsometry System

Top Region

Prior Art

Commercial Spectroscopic Reflectometry System

Bottom Region

Spectroscopic Ellipsometry System

Bottom Region

Prior Art

Commercial Spectroscopic Reflectometry System

Left Region

Spectroscopic Ellipsometry System

Left Region

Thickness L2 SI (nm)

SOI dense 2x7 (0mm, 43mm)
11-17-15 14:16

| Average = 114.82 | Std. Dev = 1.85 | Minimum = 112.53 | Maximum = 119.02 |
| Median = 114.37 | Uniformity = .03 | 10 % = 112.75 | 90 % = 117.67 |

Prior Art

Commercial Spectroscopic Reflectometry System

Right Region

Spectroscopic Ellipsometry System

Right Region

Thickness L2 SI (nm)

SOI dense 2x7 (x minus 10mm)
11-17-15 13:40

| | | | |
|---|---|---|---|
| Average = 107.35 | Std. Dev = .02 | Minimum = 107.32 | Maximum = 107.39 |
| Median = 107.35 | Uniformity = 3.29E-004 | 10 % = 107.33 | 90 % = 107.37 |

Prior Art

Commercial Spectroscopic Reflectometry System

Center Region

Spectroscopic Ellipsometry System

Center Region

SPECTROSCOPIC ELLIPSOMETRY SYSTEM FOR THIN FILM IMAGING

CROSS-REFERENCE TO RELATED APPLICATIONS

This US Patent Application is a continuation-in-part from the U.S. patent application Ser. No. 15/732,179, filed on Sep. 27, 2017 and now published as US 2023/0010806, the disclosure of which is incorporated by reference herein.

TECHNICAL FIELD

The present invention relates to optical systems for thin film measurements that employ both spectroscopic measurements and imaging ellipsometry.

RELATED ART

In the production of semiconductor devices, precise characterization of films employed in such devices is critically important because productivity and yield is largely determined by film quality and uniformity. Spectroscopic ellipsometry (SE) is widely used in the semiconductor and microelectronic industries as a non-contact and non-destructive optical technique for thin film characterization and process control. The broad acceptance of SE characterization results from high sensitivity and reproducibility of the SE methods, as well as the flexibility to measure many material types including dielectrics, semiconductors, metals, polymers, biological coatings, and multilayers of these films. Typically, SE measurements are carried out with a measurement beam having a diameter ranging from 2 mm to 50 µm to obtain a wafer map with a point-by-point mechanical scanning of the beam. However, the lateral resolution of SE is limited by the measurement spot size (which is typically about 50 µm or larger), and the measurement time limits the effective wafer coverage. As transistor dimensions continue to shrink, semiconductor manufacturers require metrology tools with increased spatial resolution and wafer coverage in order to achieve effective control of the process of assessment of the quality of the produced devices.

This Film Interference

Thin Film Interference methodologies of characterization are based on a natural phenomenon in which light waves reflected by the upper and lower boundaries of a thin film interfere with one another, either enhancing or reducing the irradiance of reflected/transmitted light. Studying the light reflected or transmitted by a thin film can reveal information about the thickness of the film and/or the effective refractive index of the film medium. Thin films have many commercial applications including anti-reflection coatings, mirrors, and optical filters. A thin film is commonly understood to be a layer of material with thickness in the sub-nanometer to micron range. The degree of constructive or destructive interference between the two light waves that have interacted with the film boundaries depends on the difference between the corresponding phases which, in turn, depends in at least in part on the wavelength of the light, the thickness of the film layer, the refractive index of the film, and the angle of incidence of the original wave on the film. Additionally, a phase shift of 180° may be introduced upon reflection at a boundary depending on the refractive indices of the materials on either side of the boundary, as known in the art. Techniques utilizing reflected light are available for non-destructive testing or monitoring of thin films.

Ellipsometry

Ellipsometry is based on change in polarization state of specularly reflected light. From analysis of such polarization changes it is possible to deduce the properties of the reflecting surface. The basic measurement parameters of ellipsometry are the amplitude ratio ($\Psi$) of the reflected light and the phase difference ($\Delta$) between two orthogonal components of the reflected light, and the complex reflectance ratio $\rho$ can be defined as $$\rho = R_P / R_S = \tan(\Psi) \exp(i\Delta)$$

where Rp and Rs are the complex reflection coefficients for light components polarized in parallel with (p) and perpendicularly to (s) the plane of incidence of light. Physical information about the sample, such as the thickness of the film or the refractive index of the material, can be deduced through model-based regression of the $\Psi$ and $\Delta$ values. Since the model-based regression is limited to the information content available from the experimental data, ellipsometry is often performed at multiple wavelengths to provide $\Delta$, $\Psi$ as functions of wavelength to increase the available information (thereby resulting in the so-called spectroscopic ellipsometry).

Microscopic Techniques

Microscopic techniques are often employed to increase spatial resolution of metrology and wafer coverage in order to achieve effective process control. Although well-established microscopy method including atomic force microscope (AFM), scanning electron microscope (SEM), and transmission electron microscope (TEM) allow the visualization of small structures and scales, these methods are "local", destructive, and substantially unsuitable for high volume manufacturing. To meet the spatial resolution and coverage requirements for future integrated circuit manufacturing, the thin film metrology technique must be fast and nondestructive, with high sensitivity and reproducibility.

Imaging Ellipsometry (IE) technique that has been developed for the quantification and visualization of the lateral thickness distribution of thin films on solid substrates. IE has drawn attention because it provides aspects of both ellipsometry and optical microscopy imaging. The IE method is based on integrating a microscope and charge-coupled device (CCD) or complementary metal oxide semiconductor (CMOS) array into an ellipsometer to acquire ellipsometric images over a microscopic area of a chosen target. While using a CCD camera as the detector and illuminating the sample at a plurality of locations or directions, IE can provide images of $\Psi$ and $\Delta$ rather than optical image similar to those obtained with a conventional microscope. This way, it is possible to carry out an ellipsometric analysis of the chosen target film over a large field of view to obtain an image characterizing the thickness distribution of a thin film layer on a surface. The main advantage of imaging ellipsometry is that every point in the field of view is measured in light reflected from the target region at the same time with high spatial resolution. However, in prior art systems, IE data are typically collected at a single wavelength, and—when compared with the results of spectroscopic ellipsometry—the accuracy, resolution, and dynamic range of the IE as demonstrated by related art are poor. Prior art ellipsometry systems typically incorporate a rotating analyzer for detection of a polarization state of light. However, the usefulness of this approach has at least a three-fold limitation. First, a rotating analyzer is not useful for detection of depolarization of light by the sample or by imperfections of an optical element used in the experiment. When such depolarization effects are not recognized and modeled, they lead o experimental errors. Second, the sign of Δ is ambiguous, which means that there are two possible solutions for Δ (e.g., Δ can only be measured from 0° to 180°). Third, the sensitivity to Δ, for nearly linearly polarized light entering the rotating analyzer (which occurs when Δ is near 0°, 180°, or 360°) is low. This limitation is rather critical for thin-film semiconductor applications, since Δ falls in the range of poor or even insufficient sensitivity in case of silicon (~180°).

Spectroscopic Ellipsometry

Spectroscopic ellipsometry (SE) devices provide data at multiple wavelengths and they are widely used in the semiconductor and microelectronic industries for non-contact and non-destructive optical thin film characterization. In typical spectroscopic ellipsometer systems of related art, the probing wavelength is changed and the ellipsometry measurement is repeated at each new wavelength. In some prior art devices, a polychromatic light beam characterized by a broad range of wavelengths is directed to a sample, and the reflected beam is diffracted to a photodetector array by a diffraction grating or a prism, and multi-wavelength ellipsometry measurements are performed with each of the diffracted beams at the same time. SE has become increasingly important for ultrathin film measurements because of its high sensitivity from the phase parameter, A, of the optical beam and is routinely used for measuring gate dielectrics in the semiconductor industry, diamond-like carbon films in magnetic data storage devices, and monolayer biological films. SE can be applied to a wide range of industrial and research applications in which specular reflection is produced from the sample of interest. An example is provided, for example, in U.S. Pat. No. 6,650,415 that describes four elaborate embodiments in which ellipsometry data are acquired at a plurality of angles and a plurality of wavelengths in order to analyze a sample. The disclosure of the U.S. Pat. No. 6,650,415 is incorporated herein by reference.

The need in a spectroscopic ellipsometry system with increased spatial resolution, speed, and wafer coverage remains unfulfilled.

SUMMARY OF THE INVENTION

Implementations of the idea of the present invention result in combination of spectroscopic and imaging ellipsometry into a single system configured for high spatial resolution thin film measurement. Embodiments include a rotating compensator and a spatial separator of light so that spectroscopic and imaging ellipsometric data can be collected simultaneously and with the use of same measurement beam reflected from a sample. The advantages of collecting ellipsometric data simultaneously at a narrow bandwidth with microscopic spatial resolution and at a broad set of spectral bandwidths increases the information content for analysis and affords a substantial increase in measurement performance as compared with the related art. The use of a rotating compensator creates, from a linearly polarized illumination beam, a range of polarization states from linear to circular. A small target region (with an area of, for example, a few square millimeters) of the sample is illuminated by the beam, formed at an output from the rotating compensator, at a single angle that is substantially equal to (at or near) the value of the Brewster's angle. Imaging ellipsometric measurements are performed in the reflected light for the small region at a narrow spectral range (in a specific non-limiting example—within the range of 615+/−5 nm) for each of a plurality of angular orientations of the rotating compensator, and ellipsometric measurements are simultaneously carried out in the reflected beam within a wide spectral range (such as, in one specific non-limiting example, from 200 nm to 1700 nm) for each of the chosen angular orientations of the rotating compensator. A spatial positioner (an XYZ-stage) is employed to adjust the position/orientation of the sample between target region measurements so as to have (1) measurements carried out only at selected target regions of the sample and/or (2) measurements carried out for all of the areas of the sample.

Preferred embodiments of this metrology system and method provides advantages over the related art, specifically resulting in very high-speed spectroscopic ellipsometric examination of polarized light reflected from the sample (i.e. high-speed, accuracy, resolution, and repeatability) and ellipsometric imaging (i.e. spatial resolution and sample coverage) while, at the same time, eliminating the limitations of each of these individual techniques. The disclosed embodiment(s) of the optical system and method for thin film measurement is fast and nondestructive, with high sensitivity and reproducibility. Simultaneous collection of both spectroscopic and imaging ellipsometric data sets with the same (as advantageously compared with method of related art) measurement beam necessarily increases the information content for the following analysis and affords a substantial increase in speed and measurement performance.

Embodiments of the invention provide, for example, an imaging spectroscopic ellipsometry apparatus that includes an illumination arm and a measurement arm. The measurement arm contains a measurement arm polarizer element that is configured to receive light (which has been delivered from the illumination arm to a pre-defined sample plane in an incident collimated light impinging thereon and transformed into a reflected collimated light at the pre-defined sample plane) directly from the sample plane and to convert said reflected collimated light into a combination of first measurement collimated light and second measurement collimated light that have mutually orthogonal linear polarizations and that propagate colinearly. The measurement arm additionally contains a spectrometer system that is positioned to receive the first measurement collimated light along a first axis and that is configured to carry out spectrometric ellipsometric measurements of a medium at the pre-defined sample plane in such first measurement collimated light. The measurement arm additionally contains an ellipsometric optical imaging system that includes a first optical detector, which is positioned to receive the second measurement collimated light along a second axis that is transverse to the first axis and which is configured to carry out ellipsometric imaging measurements of the medium at the pre-defined sample plane in said second measurement collimated light.

Embodiments of the invention additionally provide a method that includes at least the steps of: (a) delivering polychromatic light through an illumination arm of an imaging spectroscopic ellipsometry apparatus in a form of a collimated elliptically polarized polychromatic light to a pre-defined sample plane; (b) transforming such collimated elliptically polarized polychromatic light into a reflected collimated polychromatic light at the pre-defined sample plane; (c) receiving the reflected collimated polychromatic light at a measurement arm polarizer element of a measurement arm of the apparatus directly from the pre-defined sample plane. The method may additionally include processing of light in the measurement arm of the apparatus. Such processing includes converting collimated polychromatic light reflected from the pre-defined plane into a combination of first measurement collimated light and second measurement collimated light (which lights have mutually orthogonal linear polarizations and that propagate along respective mutually transverse axes) and performing two types of measurements—spectrometric ellipsometric measurement and ellipsometric imaging measurement. Spectrometric ellipsometric measurement is performed at a plurality of measurement locations of a medium at the pre-defined sample plane with a spectrometer system of the measurement arm in the first measurement collimated light received at the spectrometer system. Ellipsometric imaging measurement is carried out at such plurality of measurement locations of this medium with an ellipsometric optical imaging system of the measurement arm in the second measurement collimated light.

DETAILED DESCRIPTION

Figure 1:
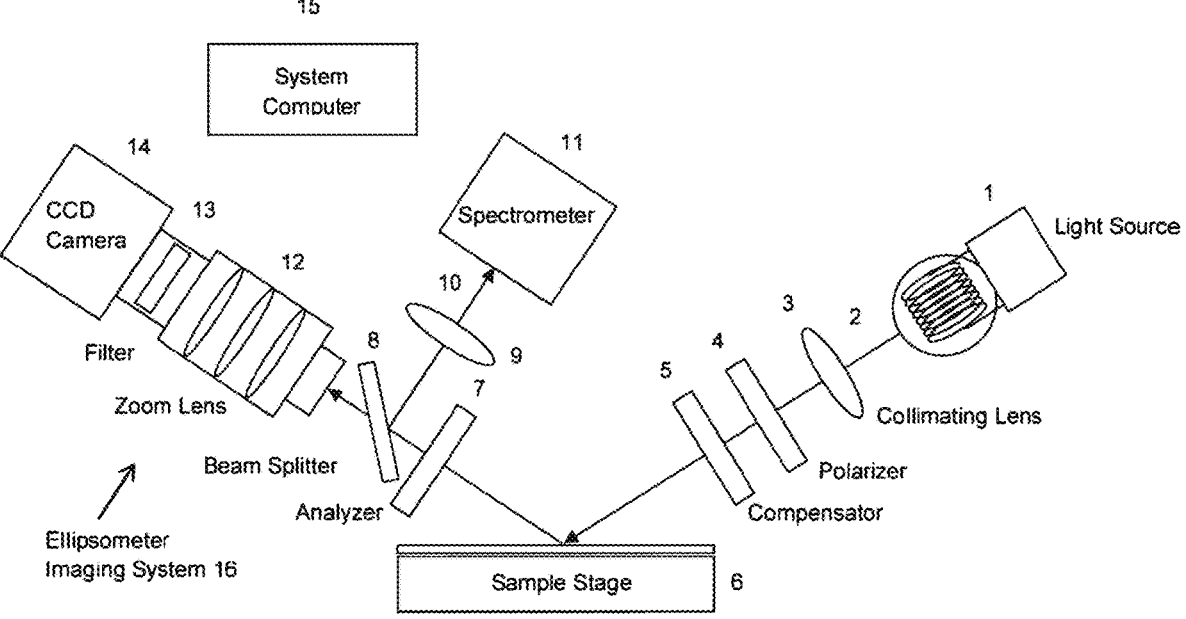
FIG. 1 is a drawing of an embodiment of the imaging spectroscopic ellipsometric system of the present invention.

A preferred embodiment of the present invention is shown in FIG. 1 as a schematic diagram of the spectroscopic ellipsometer thin film imaging system with a rotating compensator.

Simultaneous collection of both spectroscopic ellipsometric data and imaging ellipsometric data sets with the same measurement beam of light increases the information content for analysis and affords a substantial increase in measurement performance. This metrology system and method provides the benefits of being able to perform simultaneously spectroscopic examination of polarized light reflecting from a sample (at very high speed, with high accuracy, high resolution, and high level of repeatability) and ellipsometric imaging (i.e. spatial resolution and sample coverage) while at the same time eliminating the limitations typical to the individual techniques. General ellipsometric hardware systems and methods with rotating compensator design have been described previously in U.S. Pat. Nos. 7,505,133 and 8,319,966, the disclosure of each of which is incorporated herein by reference.

As shown in FIG. 1, an embodiment of the present invention includes an illumination arm of the apparatus and a measurement arm of the apparatus. The illumination arm includes components labelled, 1, 2, 3, 4, and 5, while the measurement arm includes the components labelled from 7 through 14, as discussed below. The illumination and measurement arms are at least optically connected through the sample stage 6 (and a sample plane at that stage) and a positioning system (configured to change a mutual angular orientation of the illumination and measurement arms, and not shown in FIG. 1 for simplicity of illustration.

The axis of the illumination arm can be defined by a beam incident onto the pre-defined sample plane, while the axis of the measurement arm can be defined by a beam reflected at the pre-defined sample plane. The computer system 15 is configured to govern the operation of the overall apparatus and its components and/or subsystems and, in particular, the operation of a positioning system (not shown for simplicity of illustration) that is operably cooperated with the illumination arm and the measurement arm and the sample stage 6 of the apparatus and configured to vary one or more of a mutual orientation of at least one of these arms and the sample stage (and, therefore, the pre-defined sample plane associated with the sample stage).

Illumination Arm of the Apparatus

The light source 1 that is connected to a power supply and is configured to emit spectrally broadband light for illumination. The illumination light emanating from the source 1 passes through an optical fiber 2 and lens 3, thereby forming at the output of the lens 3 substantially collimated beam light. The collimated light beam is directed through a rotatable polarizer 4 and a rotatable compensator 5 to a sample (shown positioned on automated micropositioner such as an XYZ sample stage 6, which is adapted to place small target regions, of the sample, one at a time, in the path of the collimated light beam incident towards and onto the sample from the compensator 5). The collimated incident light, delivered to the sample stage 6 (and the sample, if such sample is positioned on the stage 6) from the illumination arm of the embodiment (1, 2, 3, 4, 5) is then reflected off the small target region towards the measurement arm of the apparatus—specifically, directly towards and through the rotatable polarizer 7 (shown as the analyzer optical component) to beam splitter 8. In a preferred embodiment, the small target region may be dimensioned as a 2 mm×7 mm mapping region. For applications involving measurement of silicon samples, the angle of incidence of the collimated incident light onto the pre-defined sample plane is preferably fixed near or at about 700 (since this value of incident angle is near the Brewster angle representing a boundary between air and silicon) and thus provides maximum sensitivity of the measurement. Beam splitter 8 separates the reflected light delivered thereto through the analyzer 8 by reflects a portion of such light through a collection lens 9 and optical fiber 10 to a spectrometer system 11 (that preferably include an optically dispersive element and a linear 2048-pixel CCD array) for spectroscopic intensity measurements (spectroscopic ellipsometric measurements). The other portion of light passing through the beam splitter is directed to an ellipsometric optical imaging system 16 (which may be configured as a microscope) that includes, as shown, zoom optics 12 and a band-pass filter 13 and is equipped with a two-dimensional 307,200 (480×640) pixel CCD camera 14 for ellipsometric imaging. In one specific case, the bandwidth of the wavelength-selective optical filter 13 may be and preferably is centered at about 615 microns and is about 10 mm. Overall, the intensity spectra and intensity images are collected in collimated light reflected at the pre-defined plane simultaneously: by the spectrometer system 11 and the microscopic ellipsometric optical imaging system 16. These data are sequentially collected at a plurality of different angular orientations of the compensator 5.

Overall, the illumination arm has an illumination arm axis and includes an optical component configured to be rotatable about the illuminating arm axis to convert a linearly polarized collimated polychromatic light delivered thereto along the illumination arm axis to said incident collimated light, wherein said incident collimated light is elliptically polarized.

Light Source. The light source 1 is a broadband light source that produces polychromatic light over a predetermined wavelength range of interest. For semiconductor-measurement applications, a wavelength range of interest may and preferably includes the wavelengths in the range from about 200 nm to about 1700 nm (in one specific case, the light source is configured as a combined deuterium/ halogen light source). The light from the light source is directed through a 300 micron diameter glass fiber 2 and is collimated by the lens 3 (this may be an achromatic lens or, instead, in a related embodiment, a similarly performing optical component such as a focusing reflector/mirror).

Polarizer. A transmission axis of the rotatable polarizer 4 may be oriented at various angles with respect to the plane of illumination of the pre-defined sample plane at the stage 6) but in one embodiment such angle is about 45 degrees relative to the plane of illumination and reflection, in which case the polarization state of light propagating therethrough towards the stage 6 is well known (and can be expressed as a combination of approximately equal amounts of p-polarized light s-polarized light). In one embodiment, the polarizer 4 is made from calcite and rotated about the direction of light beam propagation by an electric motor and controller to achieve the desired azimuth angle so that the linearly polarized beam exiting the polarizer 4 is at a known angle (i.e. preferably 45 degrees) with respect to the plane of incidence.

Compensator. The beam is then directed through a rotatable compensator 5, which preferably is configured as a quarter wave plate, which introduces relative phase delays between portions of light having respective orthogonal polarizer components. The amount of phase retardation produced by the compensator is known to be dependent on the wavelength, material dispersion of the compensator material, and thickness of the compensator.

In the preferred embodiments, the compensator 5 is a mica quarter wave-plate and is rotated by an electric motor governed by a controller to orient the transmission axis according to multiple (in one specific case—eight or sixteen) known angular positions with respect to the plane of incidence, at which data are collected. For example, if data are to be collected at eight different angular orientations of the compensator 5 (corresponding to 45 degrees per each rotation) for each full revolution of the compensator, the target region of the sample will be illuminated eight times: four times with the incident beam of approximately linearly polarized light and four times with the incident beam of approximately circularly polarized light. If data are to be collected at sixteen angular orientations of the compensator (corresponding to 22.5 degrees per each rotation) for each full revolution of the compensator, the target region of the sample will be illuminated four times with the incident beam of approximately linearly polarized light, four times with the incident beam of approximately circularly polarized light, and eight times with the incident beam of approximately elliptically polarized light. The rotation of the compensator 5 may be continuous or discrete—in steps of 45 or 23.5 degrees in the above-used non-limiting examples. Data are preferably recorded at pre-defined orientations of the compensator.

Sample Stage with a Pre-Defined Sample Plane

The sample containing a thin film may be positioned to rest on the sample stage at the pre-determined sample plane, to interact with light delivered by the illumination arm of the apparatus. The sample stage of the overall apparatus is cooperated with the positioning system of the apparatus and is generally configured as a holder of a target sample subject to the spectrometric ellipsometric measurements and the ellipsometric imaging measurements. The sample is placed on an XYZ stage controlled by electric stepper motors (not shown) with, for example, a one-micron resolution in all axes (X, Y, and Z). Sample stage 6 may be controlled to collect image data at every position on the sample or at only selected positions such as shown those in FIG. 2.

Generally, the incident beam is reflected from the medium at pre-defined plane (for example, from the sample of interest positioned on the stage 6) substantially symmetrically with respect to the normal drawn to such plane, at an oblique angle equal to the angle of incidence, and towards the measurement arm of the overall apparatus. In the preferred embodiment, the light may be arranged to be incident on the sample at an angle of about 700 (since this angle value is near the value of the Brewster angle corresponding to a boundary between air and silicon) to optimize the sensitivity of the measurement of the sample properties.

Based on well-known ellipsometric principles, the polarization state of the beam of light incident at the pre-defined sample plane (for example, at the sample positioned on the stage 6) changes after interaction with the sample and upon the reflection off of the sample and is monitored by spectrometer system 11 and camera ellipsometric optical imaging system 16. The data are recorded and stored by the system computer 15.

Measurement Arm of the Apparatus

The measurement arm of the overall apparatus includes a measurement arm polarizer element, a spectrometer system, and an ellipsometric optical imaging system Analyzer. The beam of light reflected from the medium at the pre-defined sample plane further passes through a rotatable polarizer 7 (indicated in FIG. 1 and referred to as "analyzer) which is made, in at least one implementation, from calcite and is preferably rotated by an electric motor and a controller (not shown) to achieve the desired azimuth angle with respect to the plane of incidence and reflection of light at the sample. In one non-limiting case, such azimuth angle is at least 45 degrees. This analyzer represents a measurement arm polarizer element and is configured to receive light (which has been delivered from the illumination arm to a pre-defined sample plane in an incident collimated light impinging thereon and transformed into a reflected collimated light at the pre-defined sample plane directly from the pre-defined sample plane and to convert said reflected collimated light into a combination of first measurement collimated light and second measurement collimated light that have mutually orthogonal linear polarizations and that propagate colinearly.

Beam Splitter. In the preferred embodiment, a spatial beam separator (shown as the beam splitter 8) is made from two triangular glass prisms assembled and preferably glued together to form a cube, and in operation reflects a portion of the light arriving directly from the analyzer along the first axis to the spectrometer 11 while directing the remaining portion of the light along the second axis (that is transverse to the first axis) to the ellipsometer optical imaging system 16.

Spectrometer System. The reflected collimated portion of the light beam traversing the measurement arm of the apparatus of the invention passes, upon its propagation towards the spectrometer 11, through an achromatic collection optics (shown in the specific example as lens 9) and through a 600 micron diameter glass fiber 10, from the output of which such light is delivered to the spectrometer 11 for spectroscopic intensity measurement. The spectrometer 11 may include a diffraction grating oriented to angularly disperse the incoming polychromatic beam of light as a function of wavelength over the linear 2048-pixel CCD array. The spectrometer 11 measures the intensity of the different wavelengths of light reflecting from the sample throughout the wavelength range of interest that pass through the analyzer 7. As the skilled person will readily understand, the spectrometer system of the measurement arm of the overall apparatus is positioned to receive the first measurement collimated light along a first axis and configured to carry out spectrometric ellipsometric measurements of a medium at the pre-defined sample plane in such first measurement collimated light.

Ellipsometric Optical Imaging System. The portion of the collimated polychromatic beam directed through the beam splitter 8 traverses variable zoom optics 12 to produce an ellipsometric image of chosen (for example, dimensioned as a 2 mm×7 mm patch) mapping region of the sample. In the preferred embodiment, a zoom lens is judiciously chosen to allow the focal length and angle of view to be varied while at the same time maintaining the focal spot on the optical detection camera 14. The light then passes through a bandpass filter 13 and into the pixels of CCD camera 14 for ellipsometric optical imaging. In one specific implementation, the spectral bandwidth (of about 10 nm) of the wavelength-selective filter was chosen to be centered at a wavelength of about 615 nm. In the discussed case, the ellipsometric intensity images were obtained with a black and white CCD camera 14 with 640×480 individual pixel elements. As readily understood, parameters of the filter as well as the optical camera resolution can be varied to optimize ellipsometric sensitivity for the sample of interest. In summary, an ellipsometric optical imaging system of the overall apparatus includes a first optical detector positioned to receive the second measurement collimated light along a second axis that is transverse to the first axis and configured to carry out ellipsometric imaging measurements of the medium at the pre-defined sample plane in such second measurement collimated light

Simultaneous Collection of Data

Intensity spectra from the detector of the spectrometer 11 and intensity images from CCD camera 14 are preferably collected at the same time at each of multiple (in one non-limiting case—eight or 16) different angular orientations of the compensator 5. The computer 15 is configured to perform Fourier analysis of the spectroscopic intensity data from the optical detector of the spectrometer 11 to determine the ellipsometric parameters $\Psi$ and $\Delta$ as a function of compensator's angular orientation. Simultaneously, the spectrometer 11 is recording all of the wavelengths of the beam reflecting from the region of the sample that is being monitored—including the 10 nm spectral region specifically monitored by the camera 14 of the ellipsometric optical imaging system of the measurement arm of the apparatus. From the detector 11, 1 and A values are available as a function of wavelength for each 2 mm×7 mm target regions of the sample. Detector 11 does not provide spatial resolution within the 2 mm×7 mm target regions.

At the same time, Fourier analysis of the intensity images from CCD camera 14 provides spatial images of the ellipsometric parameters $\Psi$ and $\Delta$ with microscopic resolution within each of the 2 mm×7 mm target regions. Model-based regression of the spectroscopic $\Psi$ and $\Delta$ values permits very accurate determination of the values of film thickness and refractive index to be deduced for the optical data collected from the sample. This physical information about the sample is then used to constrain the regression analysis of the $\Psi$ and $\Delta$ images to arrive at an image of the thickness distribution of the film of the sample. Therefore, the film thickness across the entire sample (which, for example, may be a full wafer of a semiconductor material) can quickly be measured with microscopic spatial precision and resolution of about 10.9 µm in the X direction and about 4.2 µm in the Y direction.

Overall, the analysis of data from imaging system 16 provides values of Ψ and Δ in a narrow wavelength range, and analysis data from spectrometry system 11 provides Ψ and Δ data over a wide range of wavelengths. The data may be obtained for every target position on the sample or as many selected target positions as desired. Model-based regression and/or other simpler techniques may be utilized to determine film thickness images and other properties of the film and the sample.

Importance of Angle of Incidence

Minimization of errors of the angle of incidence of the incident collimated light onto the pre-defined sample plane over the measurement region of the sample is essential for accurate quantification of the surface thickness distribution. The incident light is collimated to ensure that the angle of incidence is constant over the entire test surface. A calibration of the angle of incidence can be performed by measuring $SiO_2$/Si samples of varying oxide thickness. In this way, errors in the angle of incidence—particularly in the x direction—can be minimized.

Prototype Demonstration

To demonstrate the feasibility of an embodiment of the imaging spectroscopic ellipsometry apparatus and method, a silicon-on-insulator (SOI) sample was measured using the apparatus of FIG. 1 and compared with spectroscopic reflectometry measurements provided by a related art instrument (FilmTek™2000 PAR-SE). The SOI sample consisted of a silicon substrate, a $SiO_2$ layer with nominal thickness of 800 Angstroms, and a Si layer with nominal thickness of 1000 Angstroms and thickness variation of several Angstroms.

Figure 2:
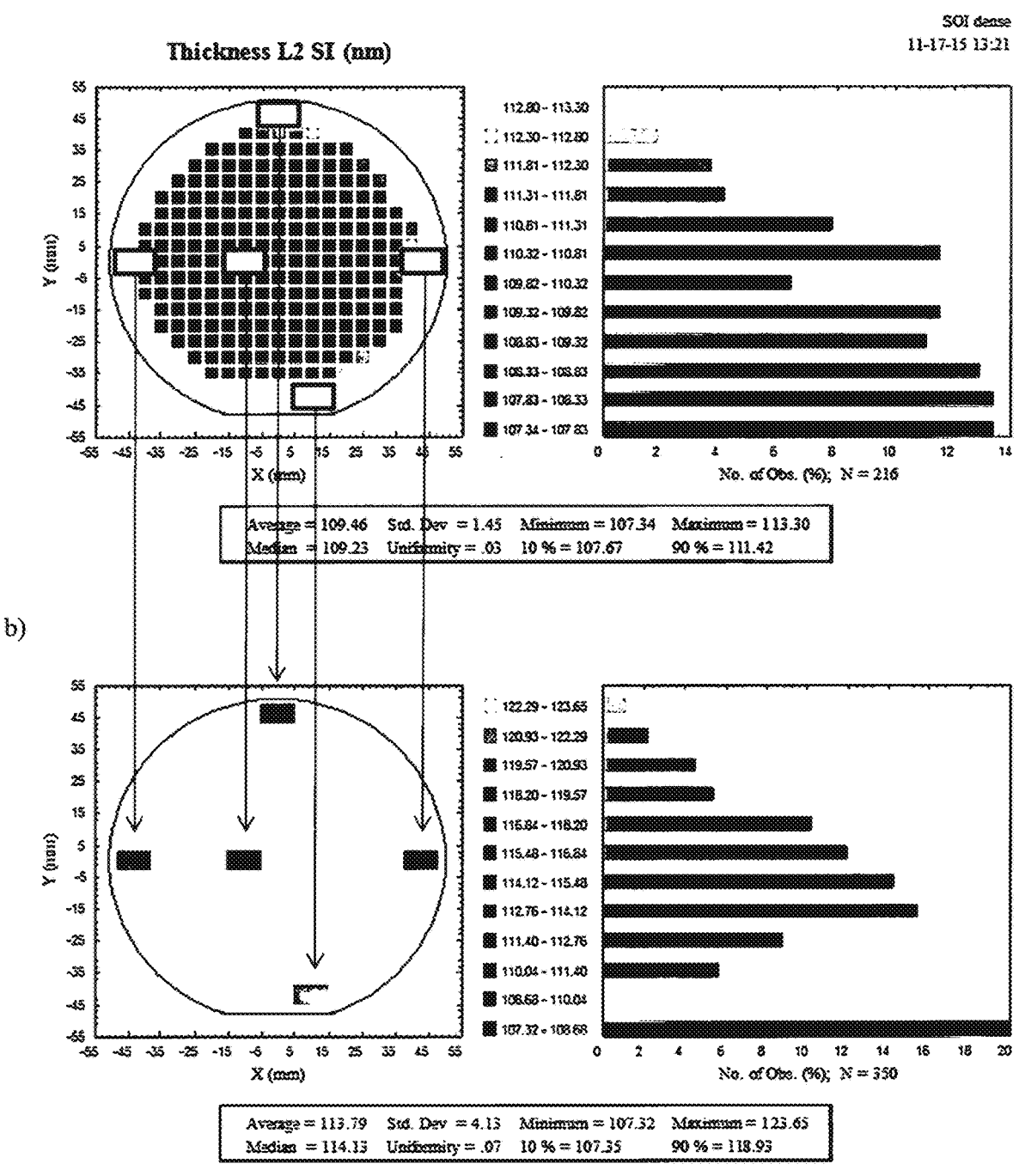
FIG. 2 is a spectroscopic reflectometric thickness map (216 points) of a silicon-on-insulator (SOI) wafer. Bottom of FIG. 2: five smaller regions of the SOI wafer (top, bottom, left, right and center) were mapped with spatially dense scans using the prior art reflectometry device (2 mm×7 mm mapping area, 50 μm spot size, 70 points).
Figure 3:
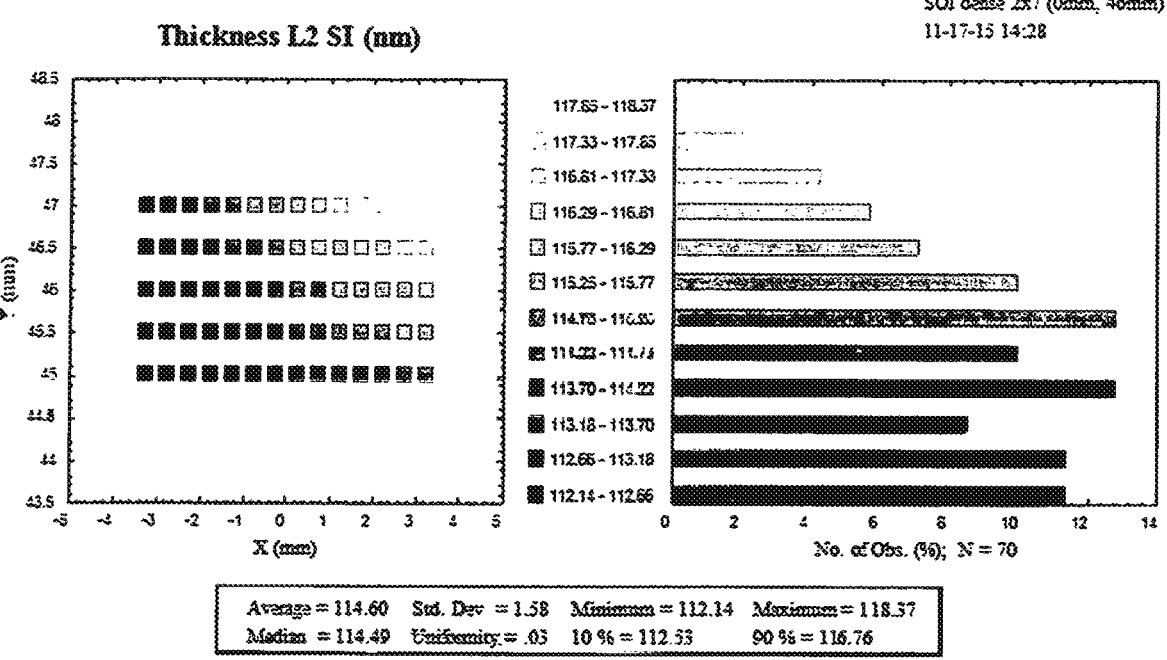
FIG. 3 provides results of a comparison between images (obtained with an embodiment of the system of related art and the embodiment of FIG. 1) of a portion of a wafer at the top of the wafer as shown in FIG. 2.
Figure 4:
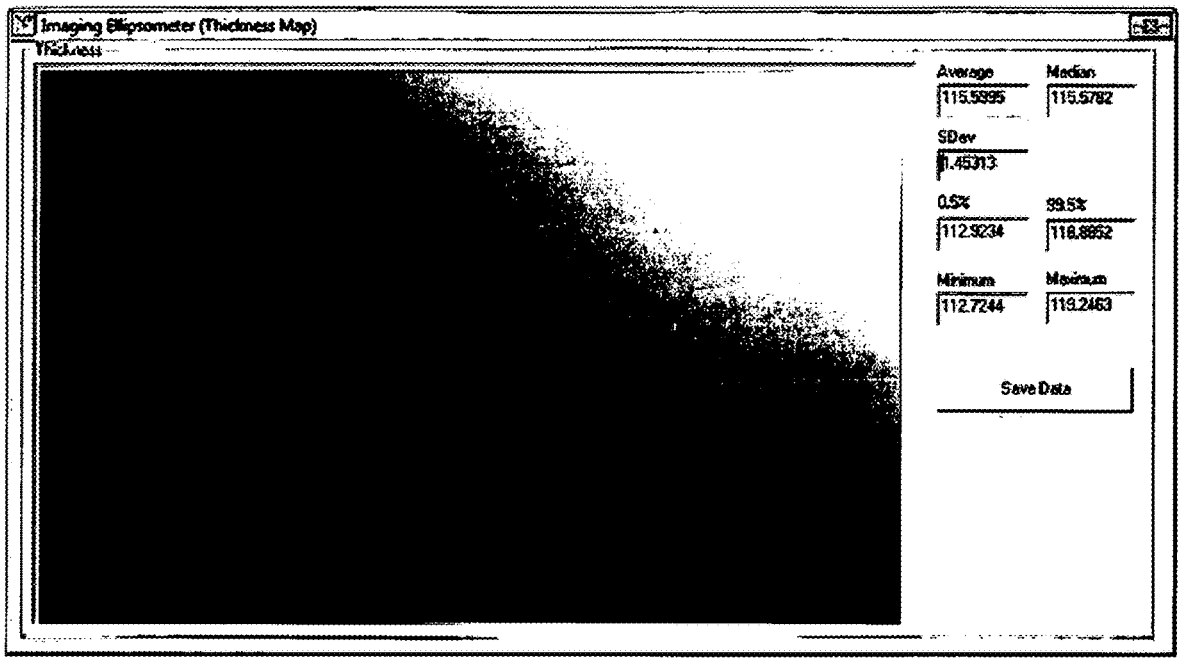
FIG. 4 provides the results of additional comparison of the images (of a portion of a wafer located at the top of the wafer shown in FIG. 2) taken with a system of related art and the embodiment of the present invention.
Figure 5:
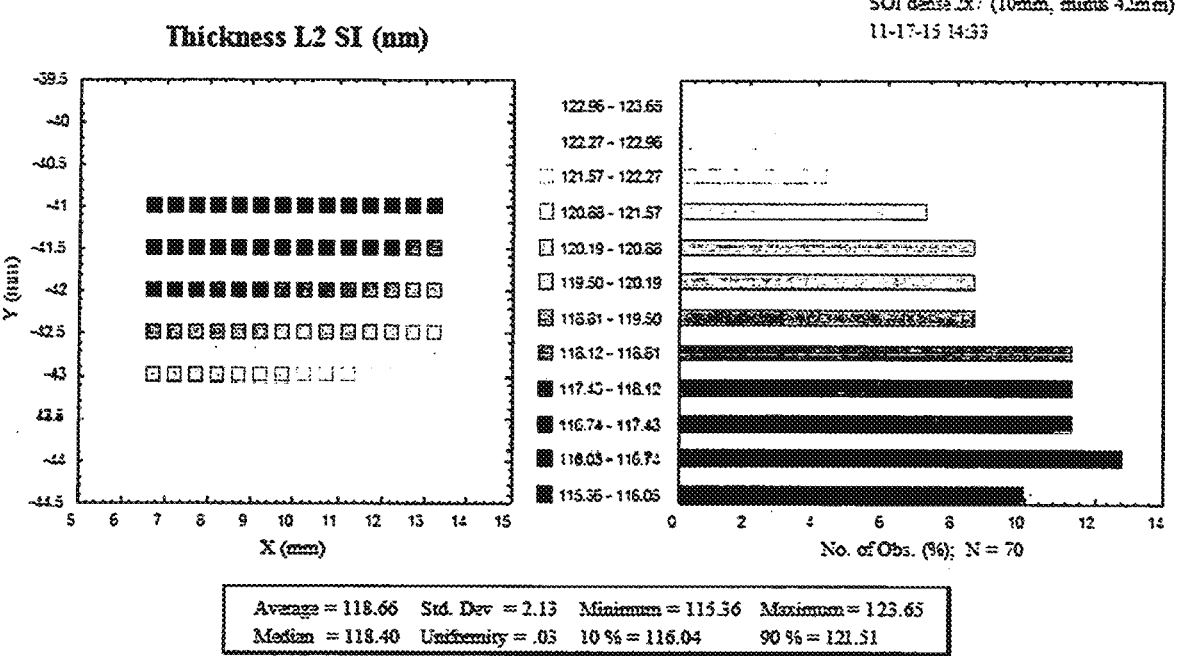
FIG. 5 provides the results of comparison of the images (of a portion of a wafer located at the bottom of the wafer shown in FIG. 2) taken with a system of related art and the embodiment of the present invention.
Figure 6:
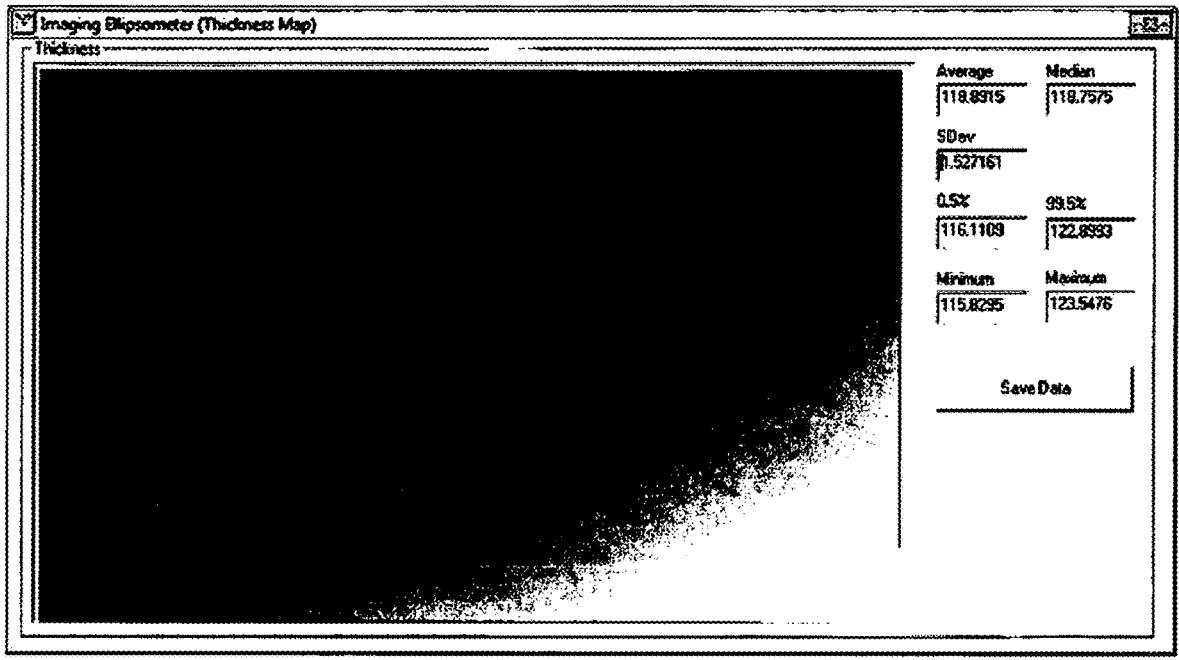
FIG. 6 provides the results of additional comparison of the images (of a portion of a wafer located at the bottom of the wafer shown in FIG. 2) taken with a system of related art and the embodiment of the present invention.
Figure 7:
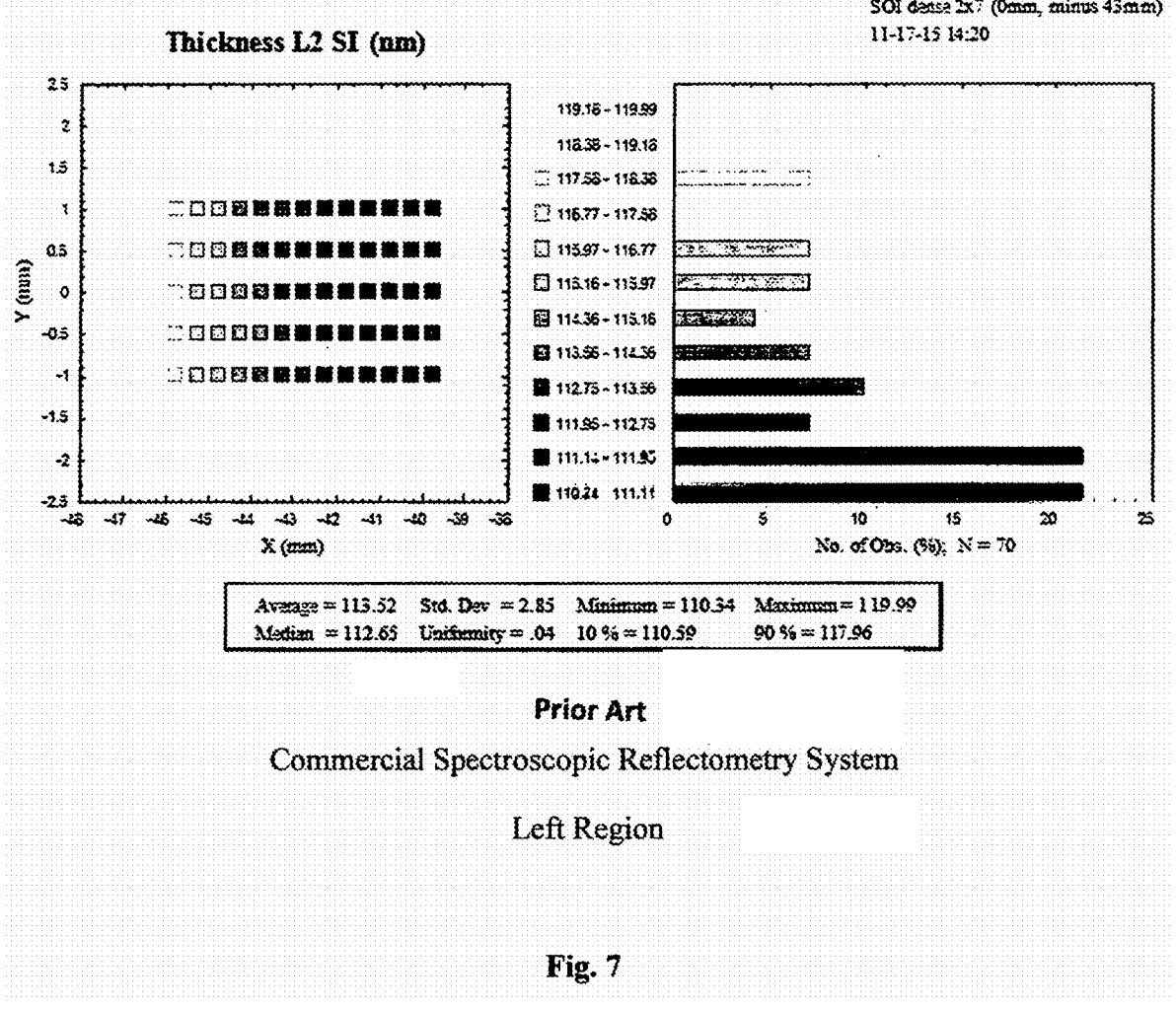
FIG. 7 illustrates the results of comparison of images of a portion of a wafer located at left side of the wafer as shown in FIG. 2.
Figure 8:
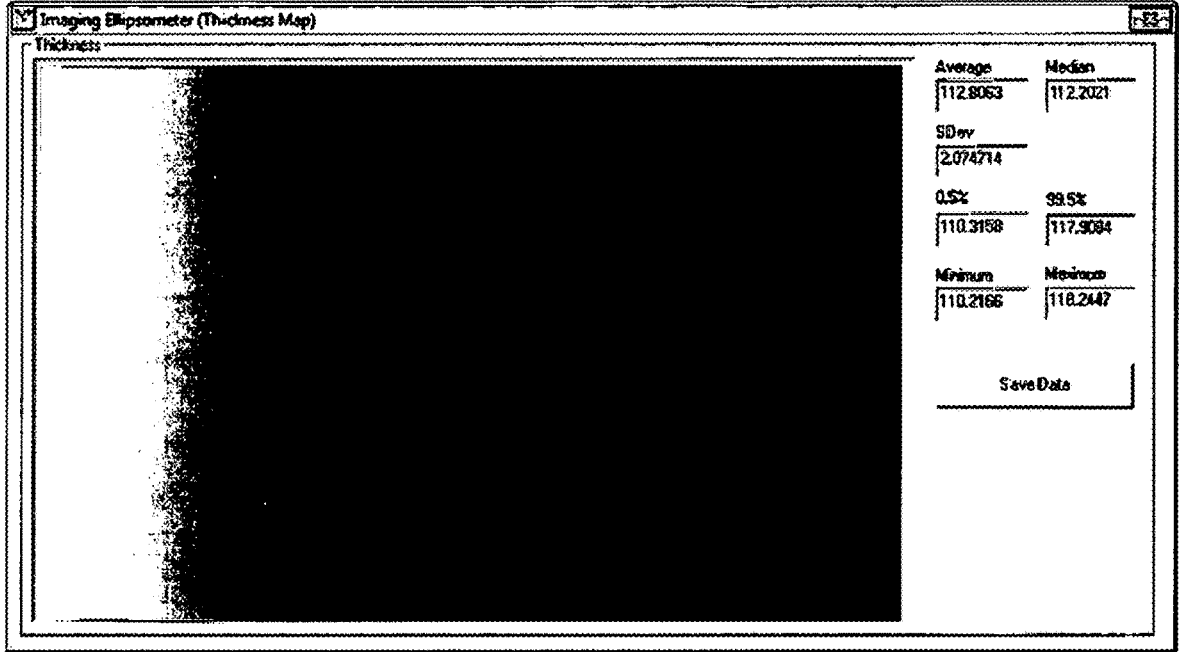
FIG. 8 provide additional (to those of FIG. 7) results of image comparison.
Figure 9:
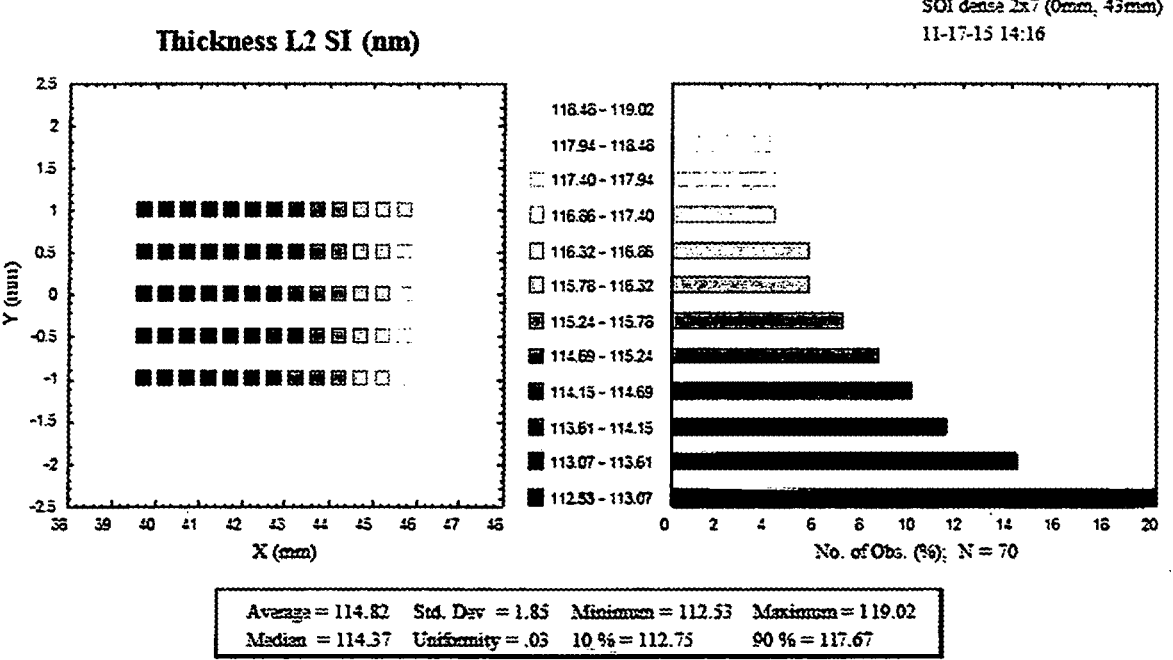
FIG. 9 compares images of a portion of a wafer located at the right side of the wafer as shown in FIG. 2, obtained with a system of related art and with the embodiment of the invention.
Figure 10:
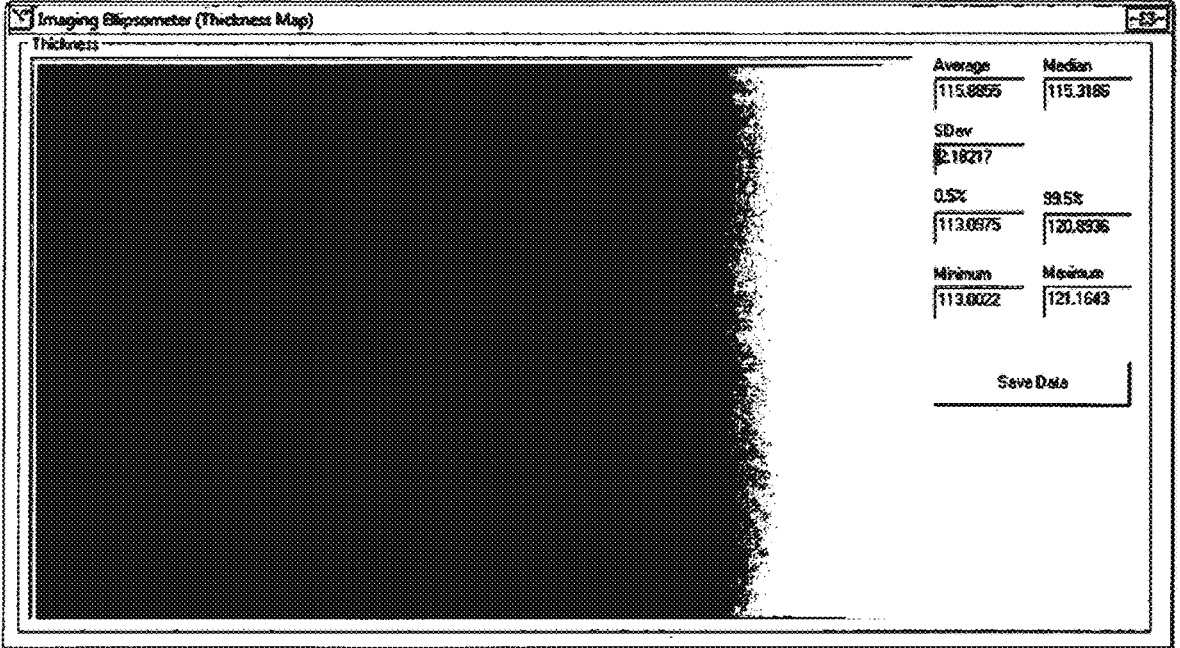
FIG. 10 provides the results of additional comparison of the images (of a portion of a wafer located at the right side of the wafer shown in FIG. 2) taken with a system of related art and the embodiment of the present invention.
Figure 11:
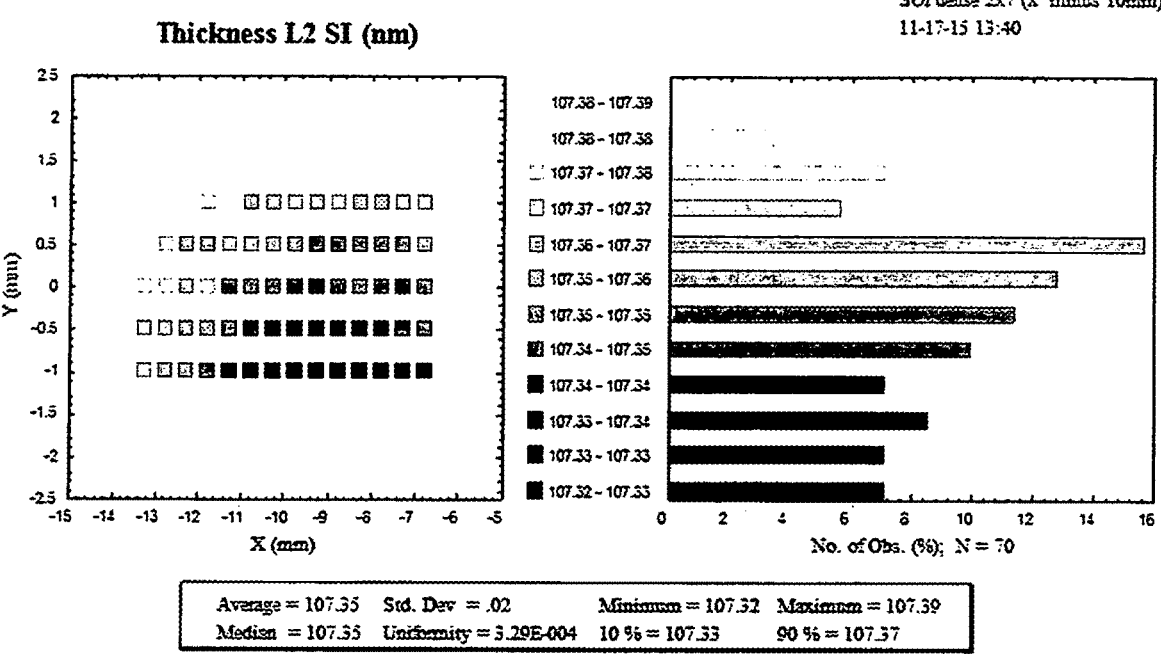
FIG. 11 provides the results of comparison of the images (of a portion of a wafer located at the center of the wafer shown in FIG. 2) taken with a system of related art and the embodiment of the present invention.
Figure 12:
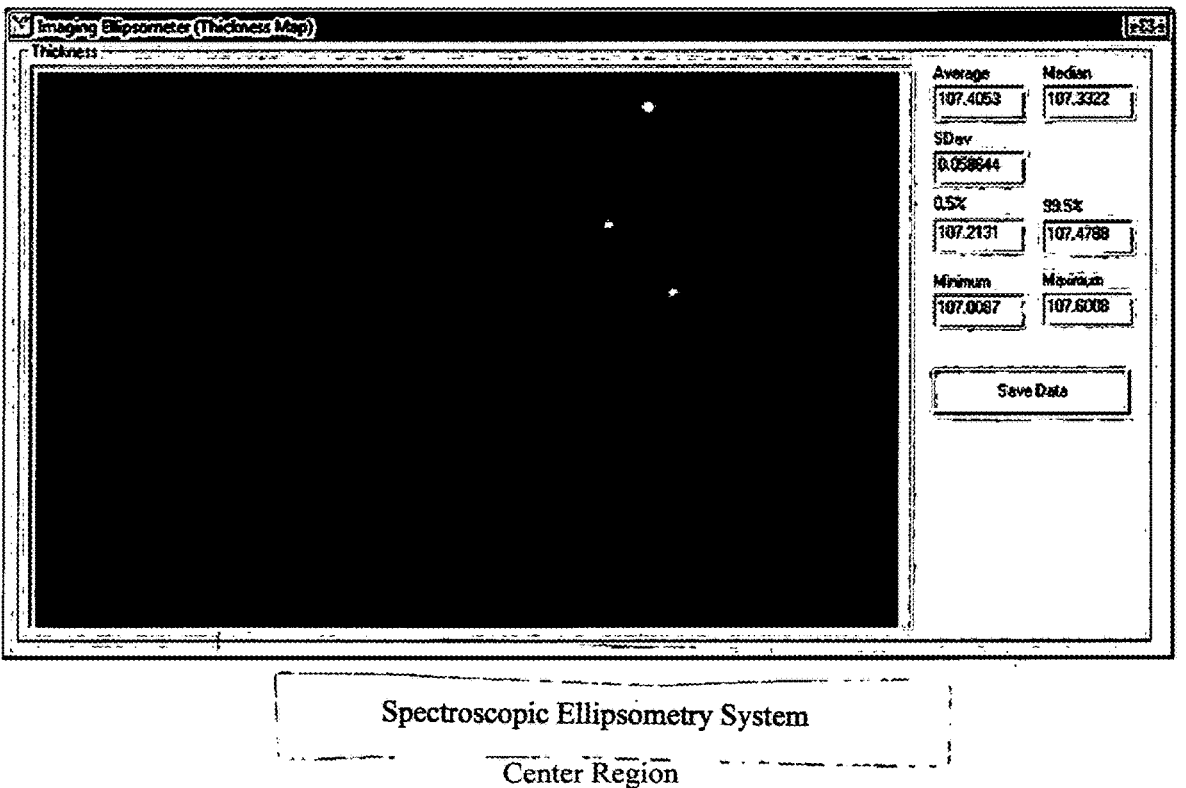
FIG. 12 provides the results of additional comparison of the images (of a portion of a wafer located at the center of the wafer shown in FIG. 2) taken with a system of related art and the embodiment of the present invention.

A 216-point thickness map of the SOI wafer measured with reflectometry displays a silicon thickness variation of several Angstroms from the wafer center to the wafer edge, as shown in FIG. 2. Also, as shown at the bottom of FIG. 2, five smaller regions of the SOI wafer (top, bottom, left, right, and center) were mapped with spatially dense scans using the prior art reflectometry device (2 mm×7 mm mapping area, 50 µm spot size, 0.5 mm step size, 70 points). The silicon thickness at the edges of the wafer showed significant variation in these scans, while the center region was quite uniform.

The spectroscopic reflectivity measurements with the FilmTek 2000 PAR-SE instrument of related art for the same five regions were compared with measurements performed with an embodiment of the invention. The results are shown in FIGS. 3 through 12 [i.e. top region (FIGS. 3 and 4), bottom region (FIGS. 5 and 6), left region (FIGS. 7 and 8), right region (FIGS. 9 and 10), arid center region (FIGS. 11 and 12)]. The measurement beam size was set to 2 mm×7 mm, and the spectroscopic ellipsometric data was collected between 400-900 nm (i.e. near UV to near IR). The band of the band-pass filter was centered at 615 nm and a black-and-white CCD camera 14 with 640×480 pixels was used for collecting the ellipsometric images. With a 2 mm×7 mm field of view, the resolution per pixel was 10.9 µm along the x axis and 4.2 µm along the y axis for the imaging data. Simulation and analysis of the measured Ψ and Δ data was performed using FilmTek™ software, an optical thin film modeling package based on Abeles 2×2 matrix method. (See: F. Abeles, "Research on the propagation of electromagnetic waves in stratified media-application to thin films, " Ann. Phys. 5,596 (1950), U.S. Pat. Nos. 5,889,592 and 5,999,267, the disclosure of each of which is incorporated herein by reference)

Comparison of the measured data for the identified five spatial regions showed excellent correlation between the measurements performed with a commercial spectroscopic reflectometer and those performed with the spectroscopic and imaging ellipsometer system of the current invention.

Both the prior art commercial instrument and the embodiment of the present invention utilize color (spectral information) to indicate thin film thickness. Thickness values are given in nanometers. FIGS. 2 through 12 are black and white copies of color print-outs produced by the system computers in prior art FilmTek reflectometry system and in embodiments of the present invention. Both systems used a spectrum of shades of colors from red, orange, yellow, green and blue that represent the thicknesses shown in the drawings, from 117.85-118.37 (red) to 112.14-112.66 (blue). While colors are not evident in these black and white copies, but the Applicant represents that the computer-generated color maps clearly matched the color images produced by the prior art FilmTek unit. The computer 15 of this preferred embodiment also calculated average and medium thicknesses, 0.5% and 99.5% as well as maximum and minimum thickness values and the standard deviation for each of the five mapped areas. These values are shown in FIGS. 4, 6, 8, 10, and 12.

While the spectroscopic reflectometry measurements took several minutes per map and only covered a small portion of each 2 mm×7 mm region, the imaging spectroscopic ellipsometry apparatus of the present invention measured the entire 2 mm×7 mm region in less than a few seconds. When compared with conventional spectroscopic reflectometry or ellipsometry techniques, the spectroscopic and imaging ellipsometer system and method provides improved wafer coverage, spatial resolution, and speed while maintaining high thickness sensitivity and reproducibility.

Advantages Provided by Implementations of the Present Invention

Consider a typical process control measurement for a 300 mm SOI wafer, where it is necessary to monitor silicon thickness uniformity over large areas (e.g. wafer scale) and silicon thickness uniformity over small areas (e.g. transistor scale). Conventional methods such as spectroscopic ellipsometry or reflectometry could provide a measure of the thickness variation for the wafer scale, but would not readily provide uniformity information for smaller scales due to the achievable minimum spot size and the long measurement times required for such high-density mapping measurements. Alternatively, measurement of a wafer map with the embodiment of the invention readily determines thickness uniformity information over large and small scales, including film (in one example—a $SiO_2$ film) thickness, thickness of the underlying wafer material (in one example—thickness of the silicon wafer), the average sample/wafer thickness for each IE measurement location, the standard deviation of the sample/wafer thickness for each IE measurement location, the maximum sample/wafer thickness for each IE measurement location, and the minimum sample/wafer thickness for each IE measurement location. Additionally, the IE thickness images are saved at each location of the wafer map for later review. In this fashion, a substantial increase in measured process control data is achieved with the spectroscopic and imaging ellipsometer system while maintaining measurement times that are commensurate with conventional ellipsometric methods.

Significant improvements in measurement speed can be obtained in the method of data analysis of the ellipsometric images. Obtaining the image of the film thickness distribution from the pixel-by-pixel regression analysis of the $\Psi$ and $\Delta$ images requires significant computational time that increases with the number of pixels in the used CCD camera. Alternatively, high speed conversion of the measured $\Psi$ and $\Delta$ images to film thickness can be obtained for known structures by relating the thickness of the film of interest to $\Psi$ and $\Delta$ with a polynomial function.

Figure 13:
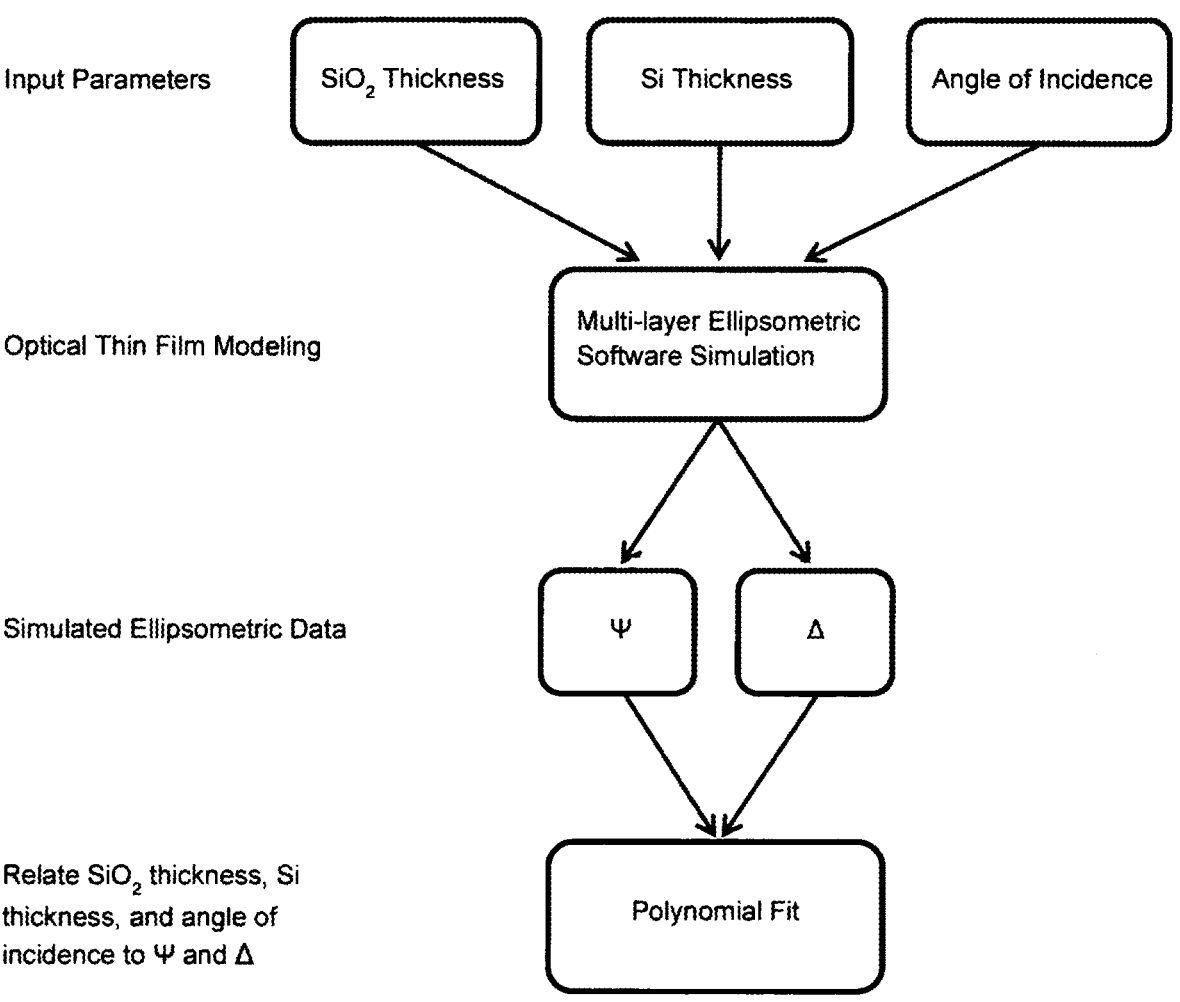
FIG. 13 is a flow diagram showing steps of a process for monitoring thin films of a silicon wafer. The input parameters of $SiO_2$ thickness, Si thickness, and angle of incidence for an SOI film structure are related to simulated $\Psi$ and $\Delta$ values with a polynomial function.
Figure 14:
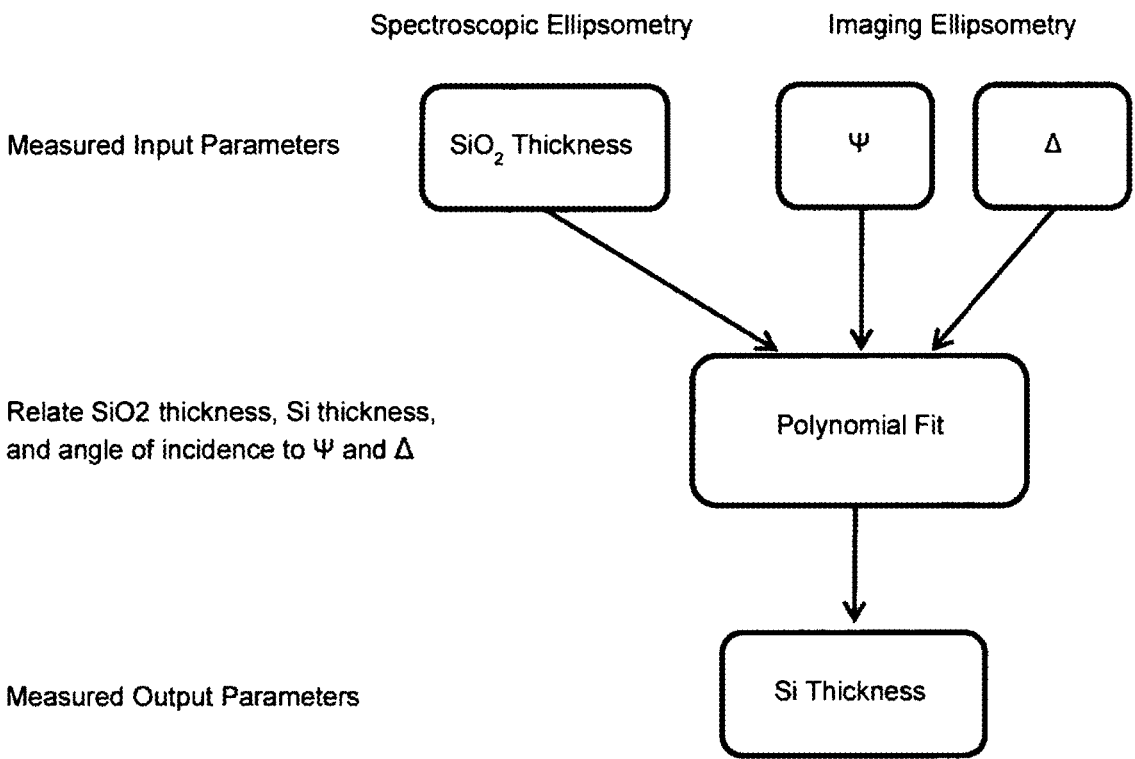
FIG. 14 is a flow diagram showing additional steps of a process for monitoring thin films of the process shown in FIG. 13. The use of input measurements of $\Psi$, $\Delta$ and oxide thickness allows for use of a polynomial function to determine thickness of Si instead of using a time-consuming regression analysis of the $\Psi$ and $\Delta$ image data.
Figure 15:
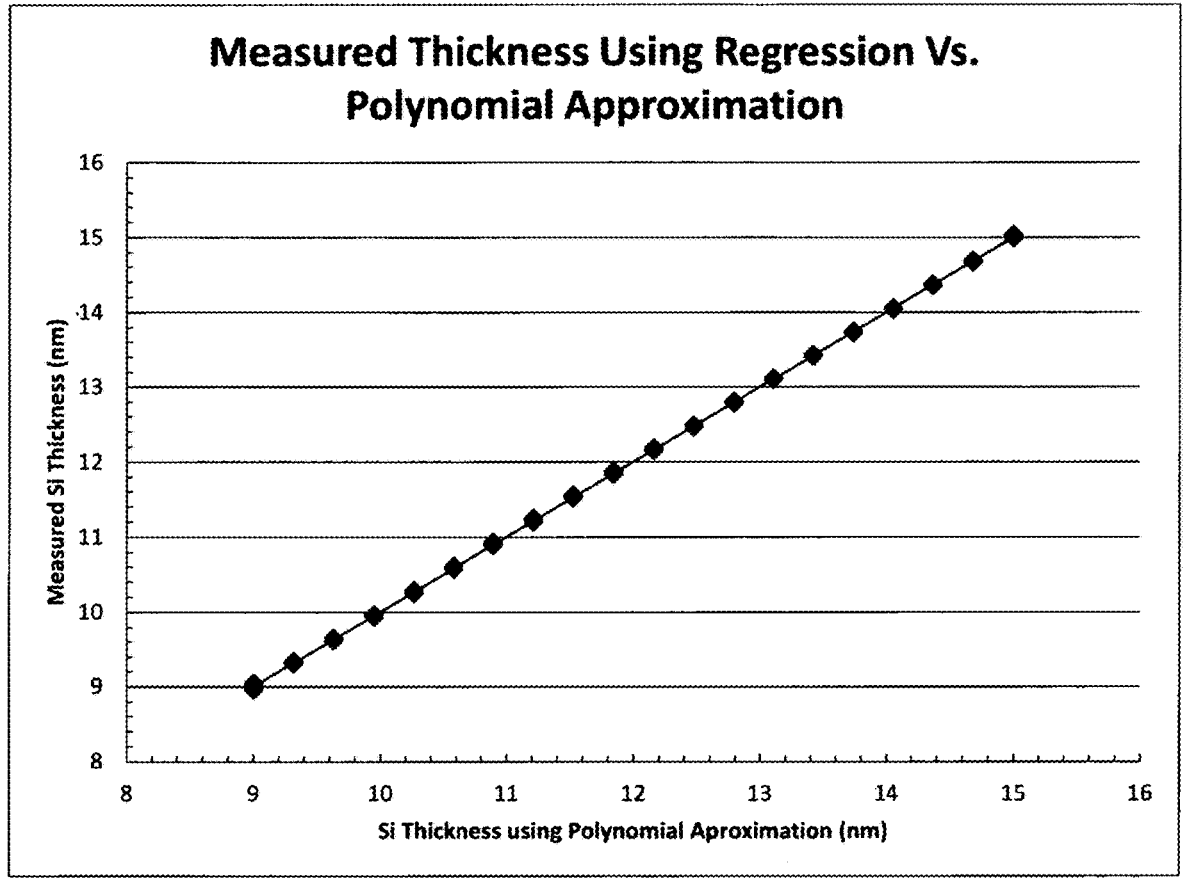
FIG. 15 illustrates a comparison of results obtained with the embodiment of the present invention with those generated by a full regression analysis. The graph displays the measured silicon film thickness using full regression analysis of the $\Psi$ and $\Delta$ data versus the polynomial approximation method. The results of the polynomial approximation are in very good agreement with the results of the full regression analysis.

Consider the previous process control measurement for an SOI wafer. A flow chart for the polynomial approximation method for determining silicon thickness from the measured $\Psi$ and $\Delta$ is shown in FIGS. 13 and 14. First, a polynomial function is created to relate the thickness the thin film (such as the $SiO_2$ thin film), the thickness of the underlying sample/wafer (such as the Si wafer), and the angle of incidence for an SOI film structure to simulated $\Psi$ and $\Delta$ values. After fitting the polynomial function for a particular film structure and thickness range; the function can be used to calculate Si thickness directly from input measurements of $\Psi$ and $\Delta$ and thickness of the oxide film (in this specific example). The polynomial approximation method reduces computational time significantly compared to a point-by-point regression analysis of the ellipsometric images. A graphical comparison of the measured silicon film thickness using full regression analysis of the thickness data versus the polynomial approximation method is shown in FIG. 15. The data shows the polynomial approximation is in very good agreement with the full regression analysis.

Examples of Alternatives

Although only one specific embodiment of the present invention has been described above, persons skilled in this art will recognize that many variations of the proposed methodology are possible. For example, embodiments of the present invention can be used to characterize composition, roughness, depth, crystalline features, doping concentration, electrical conductivity and other material properties of thin films and surfaces. As stated above, the preferred angle of incidence of light on the pre-defined sample plane is about the value of the applicable Brewster's angle—but in related embodiments the angle of incidence may include substantially any value in the range from about 50 degrees to about 75 degrees. The polarizer of the illumination arm of the apparatus (shown as polarizer 4 in FIG. 1) may in some embodiments be oriented at angles other than 45 degrees—such as, for example, at an angle falling within the range from about 5 degrees to about 85 degrees. The preferred implementation of the spectrometer (denoted as 11 in FIG. 1) includes a diffraction grating and a linear CCD array but other spectrometers may be employed. Other broadband light sources could be used instead of the discussed deuterium halogen light source (for example, other halogen sources, an LED source, or a Xenon lamp). As described above, the embodiment utilizes two polarizers (shown as 4 and 8 in FIG. 1) that can be rotatable or fixed in space but—when configured to be rotatable—such polarizers are normally fixed in space during the process of film imaging. The compensator component is rotated to assume a number of angular positions during the imaging processes. Normally, these rotations may be configured at equal angular increments or to arrive a plurality of desired angles. The rotation of the compensator could be continuous with the computer controlling data collection at specific rotation angles of the compensator.

The reader should note that the spatial resolution for the imaging ellipsometer is readily controlled by changing the number of pixels in the CCD camera and/or changing the image field of view. Stitching multiple CCD cameras together with beam splitters would allow for a method of increasing the field of view without loss of spatial resolution. Additionally, a color or spectroscopic imaging ellipsometer can be designed by capturing the ellipsometric images with a color CCD camera and utilizing a 3-color band-pass filter rather than a single narrow wavelength band-pass filter. In this way, ellipsometric intensity image data can be collected at three different wavelengths simultaneously from a single image captured by the color CCD. The dynamic range of the camera can be increased significantly by changing the integration time (e.g. shutter speed) for each image. In the present configuration, the illumination beam is collimated to reduce angle of incidence variation over the measurement region. However, the incident light could be focused in order to maximize the angle of incidence variation in the x direction of CCD data collection. In this way, variable angle information along the x axis can be added to the imaging ellipsometric data. Therefore, the scope of the present invention should be determined by the attached claims and not by the specific examples described above.

To effectuate the operation of an embodiment of the invention, the judicious use of a processor (computer) controlled by application-specific instructions stored in a tangible memory element may be required. Those skilled in the art should readily appreciate that required algorithmic functions, operations, and decisions may be implemented as computer program instructions, software, hardware, firmware or combinations thereof. Those skilled in the art should also readily appreciate that instructions or programs defining the functions and elements of the present invention may be delivered to a processor in many forms, including, but not limited to, information permanently stored on non-writable storage media (e.g. read-only memory devices within a computer, such as ROM, or devices readable by a computer I/O attachment, such as CD-ROM or DVD disks), information alterably stored on writable storage media (e.g. floppy disks, removable flash memory and hard drives) or information conveyed to a computer through communication media, including wired or wireless computer networks. In addition, while the invention may be embodied in software, the functions necessary to implement the invention may optionally or alternatively be embodied in part or in whole using firmware and/or hardware components, such as combinatorial logic, Application Specific Integrated Circuits (ASICs), Field-Programmable Gate Arrays (FPGAs) or other hardware or some combination of hardware, software and/or firmware components.

References made throughout this specification to "one embodiment," "an embodiment," "a related embodiment," or similar language mean that a particular feature, structure, or characteristic described in connection with the referred to "embodiment" is included in at least one embodiment of the present invention. Thus, appearances of these phrases and terms may, but do not necessarily, refer to the same implementation. It is to be understood that no portion of disclosure, taken on its own and in possible connection with a figure, is intended to provide a complete description of all features of the invention.

It is also to be understood that no single drawing is intended to support a complete description of all features of the invention. In other words, a given drawing is generally descriptive of only some, and generally not all, features of the invention. A given drawing and an associated portion of the disclosure containing a description referencing such drawing do not, generally, contain all elements of a particular view or all features that can be presented is this view, for purposes of simplifying the given drawing and discussion, and to direct the discussion to particular elements that are featured in this drawing. A skilled artisan will recognize that the invention may possibly be practiced without one or more of the specific features, elements, components, structures, details, or characteristics, or with the use of other methods, components, materials, and so forth. Therefore, although a particular detail of an embodiment of the invention may not be necessarily shown in each and every drawing describing such embodiment, the presence of this detail in the drawing may be implied unless the context of the description requires otherwise. In other instances, well known structures, details, materials, or operations may be not shown in a given drawing or described in detail to avoid obscuring aspects of an embodiment of the invention that are being discussed.

The invention as recited in claims appended to this disclosure is intended to be assessed in light of the disclosure as a whole, including the recitations in the claims and features disclosed in prior art to which reference is made.

For the purposes of this disclosure and the appended claims, the use of the terms "substantially", "approximately", "about" and similar terms in reference to a descriptor of a value, element, property or characteristic at hand is intended to emphasize that the value, element, property, or characteristic referred to, while not necessarily being exactly as stated, would nevertheless be considered, for practical purposes, as stated by a person of skill in the art. These terms, as applied to a specified characteristic or quality descriptor means "mostly", "mainly", "considerably", "by and large", "essentially", "to great or significant extent", "largely but not necessarily wholly the same" such as to reasonably denote language of approximation and describe the specified characteristic or descriptor so that its scope would be understood by a person of ordinary skill in the art. In one specific case, the terms "approximately", "substantially", and "about", when used in reference to a numerical value, represent a range of plus or minus 20% with respect to the specified value, more preferably plus or minus 10%, even more preferably plus or minus 5%, most preferably plus or minus 2% with respect to the specified value. As a non-limiting example, two values being "substantially equal" to one another implies that the difference between the two values may be within the range of +/−20% of the value itself, preferably within the +/−10% range of the value itself, more preferably within the range of +/−5% of the value itself, and even more preferably within the range of +/−2% or less of the value itself.

The use of these terms in describing a chosen characteristic or concept neither implies nor provides any basis for indefiniteness and for adding a numerical limitation to the specified characteristic or descriptor. As understood by a skilled artisan, the practical deviation of the exact value or characteristic of such value, element, or property from that stated falls and may vary within a numerical range defined by an experimental measurement error that is typical when using a measurement method accepted in the art for such purposes.

The expression "A and/or B" has a meaning that is "A alone, B alone, or A and B together".

Modifications to, and variations of, the illustrated embodiments may be made without departing from the inventive concepts disclosed herein. Furthermore, disclosed aspects, or portions of these aspects, may be combined in ways not listed above. Accordingly, the invention should not be viewed as being limited to the disclosed embodiment(s). In addition, the terminology used herein is with the purpose of describing particular embodiments only, and is not intended to limit the scope of the present invention.

The invention claimed is:

1. An imaging spectroscopic ellipsometry apparatus comprising:
   an illumination arm, and
   a measurement arm that includes:
      a measurement arm polarizer element configured to receive light, which has been delivered from the illumination arm to a pre-defined sample plane in an incident collimated light impinging thereon and transformed into a reflected collimated light at the pre-defined sample plane, directly from the pre-defined sample plane and to convert said reflected collimated light into a combination of first measurement collimated light and second measurement collimated light that have mutually orthogonal linear polarizations and that propagate colinearly,
      a spectrometer system positioned to receive the first measurement collimated light along a first axis and configured to carry out spectrometric ellipsometric measurements of a medium at the pre-defined sample plane in said first measurement collimated light, and
      an ellipsometric optical imaging system including a first optical detector positioned to receive the second measurement collimated light along a second axis that is transverse to the first axis and configured to carry out ellipsometric imaging measurements of the medium at the pre-defined sample plane in said second measurement collimated light.

2. An apparatus according to claim 1, further comprising a positioning system configured to vary one or more of a mutual orientation of the illumination arm and the pre-defined sample plane and a mutual orientation of the measurement arm and the pre-defined sample plane.

3. An apparatus according to claim 2, comprising a sample stage cooperated with said positioning system and configured as a holder of a target sample subject to the spectrometric ellipsometric measurements and the ellipsometric imaging measurements.

4. An apparatus according to claim 1, wherein the illumination arm has an illumination arm axis and includes an optical component configured to be rotatable about the illuminating arm axis to convert a linearly polarized collimated polychromatic light delivered thereto along the illumination arm axis to said incident collimated light, wherein said incident collimated light is elliptically polarized.

5. An apparatus according to claim 4, comprising a source of a polychromatic light, collimating optics configured to receive the polychromatic light from the source and to form a collimated polychromatic light, and a polarizer configured to receive the collimated polychromatic light from the collimating optics and to transform said collimated polychromatic light to said linearly polarized collimated polychromatic light.

6. An apparatus according to claim 4, wherein said optical component includes a quarter-wave plate.

7. An apparatus according to claim 4, configured to turn said optical component at eight or sixteen equal angular increments for each full rotation of said optical component.

8. An apparatus according to claim 1, wherein the ellipsometric optical imaging system has a variable focal length and includes an optical spectral filter, wherein the first optical detector is configured to generate ellipsometric images of the medium.

9. An apparatus according to claim 1, wherein the spectrometer system comprises an optical diffractive element and a second optical detector configured to record spectral information.

10. An apparatus according to claim 1, comprising a computer system in operable communication with portions of the apparatus and configured to govern an operation of the apparatus to effectuate a plurality of imaging ellipsometry (IE) measurements for a plurality of measurement locations at the pre-defined sample plane.

11. An apparatus according to claim 10, comprising a reversibly spatially-repositionable sample holder configured as a holder of a target sample subject to the spectrometric ellipsometric measurements and the ellipsometric imaging measurements, and wherein the computer is programmed, when the target sample contains a substrate and a thin film thereon, to determine: a film thickness uniformity, an average film thickness for each of said plurality of the measurement locations, a standard deviation of film thickness for each of said plurality of the measurement locations, the maximum substrate thickness for each of said plurality of the measurement locations, and the minimum substrate thickness for each of said plurality of the measurement locations.

12. An apparatus according to claim 11, configured such that the plurality of the measurement locations includes an entire effective surface of the target sample and to accomplish each IE measurement of said plurality of the IE measurements in a time shorter than 5 seconds.

13. An apparatus according to claim 10, comprising a reversibly spatially-repositionable sample holder configured as a holder of a target sample subject to the spectrometric ellipsometric measurements and the ellipsometric imaging measurements, wherein, when the target sample contains a substrate and a thin film thereon, the computer is programmed to perform regression analysis to determine an amplitude ratio ($\Psi$) data and a phase difference ($\Delta$) data for a p-polarized light and a s-polarized light characterizing said thin film.

14. An apparatus according to claim 13, configured such that the plurality of the measurement locations includes an entire effective surface of the target sample and configured to accomplish each IE measurement of said plurality of the IE measurements in a time shorter than 5 seconds.

15. An apparatus according to claim 13, configured to create a polynomial function representing said thin film based on the $\Psi$ data and the $\Delta$ data.

16. An apparatus according to claim 1, configured to deliver said light from the illumination arm to the pre-defined sample plane at an angle of incidence having a value that deviates from the Brewster's angle, defined relative to a normal to the pre-defined sample plane, by no more than 5 degrees.

17. A method comprising:

delivering polychromatic light through an illumination art of an imaging spectroscopic ellipsometry apparatus in a form of a collimated elliptically polarized polychromatic light to a pre-defined sample plane;

transforming said collimated elliptically polarized polychromatic light into a reflected collimated polychromatic light at the pre-defined sample plane;

receiving said reflected collimated polychromatic light at a measurement arm polarizer element of a measurement arm of said apparatus directly from said pre-defined sample plane;

in the measurement arm, converting said reflected collimated polychromatic light into a combination of a first measurement collimated light and a second measurement collimated light that have mutually orthogonal linear polarizations and that propagate along respective mutually transverse axes;

performing spectrometric ellipsometric measurements at a plurality of measurement locations of a medium at the pre-defined sample plane with a spectrometer system of the measurement arm in the first measurement collimated light received at the spectrometer system; and carrying out ellipsometric imaging measurements at said plurality of the measurement locations of said medium with an ellipsometric optical imaging system of the measurement arm in the second measurement collimated light.

18. A method according to claim 17, wherein said delivering the polychromatic light to the pre-defined sample plane includes impinging said collimated elliptically polarized polychromatic light on the pre-defined sample plane at an angle of incidence that has a value deviating from the Brewster's angle, defined relative to a normal to the pre-defined sample plane, by no more than 5 degrees.

19. A method according to claim 17, further comprising:

when the medium includes a sample that contains a substrate and a thin film thereon, performing a regression analysis with a computer processor of the apparatus to determine an amplitude ratio ($\Psi$) data and a phase difference ($\Delta$) data for a p-polarized light and a s-polarized light characterizing said thin film.

20. A method according to claim 17, further comprising:

when the medium includes a sample that contains a substrate and a thin film thereon, determining, with a computer processor of the apparatus, a thin film thickness uniformity, an average film thickness for each of said plurality of the measurement locations, a standard deviation of film thickness for each of said plurality of the measurement locations, the maximum substrate thickness for each of said plurality of the measurement locations, and the minimum substrate thickness for each of said plurality of the measurement locations.

* * * * *